(12) United States Patent
Stanescu et al.

(10) Patent No.: US 9,751,616 B1
(45) Date of Patent: Sep. 5, 2017

(54) METHODS AND APPARATUS TO RETAIN A ROTOR BLADE

(71) Applicant: The Boeing Company, Chicago, IL (US)

(72) Inventors: Adrian Stanescu, Maple Valley, WA (US); Donald Thomas Powell, Everett, WA (US)

(73) Assignee: THE BOEING COMPANY, Chicago, IL (US)

( * ) Notice: Subject to any disclaimer, the term of this patent is extended or adjusted under 35 U.S.C. 154(b) by 1337 days.

(21) Appl. No.: 13/659,194

(22) Filed: Oct. 24, 2012

(51) Int. Cl.
*B64C 11/04* (2006.01)
*B64C 11/06* (2006.01)
*B64C 11/30* (2006.01)
*F01D 5/30* (2006.01)
*F04D 29/34* (2006.01)
*F04D 29/36* (2006.01)

(52) U.S. Cl.
CPC .............. *B64C 11/06* (2013.01); *B64C 11/04* (2013.01); *B64C 11/30* (2013.01); *F01D 5/30* (2013.01); *F04D 29/34* (2013.01); *F04D 29/36* (2013.01)

(58) Field of Classification Search
CPC ........ F04D 29/34; F04D 29/36; F04D 29/362; F04D 29/364; B64C 11/06; B64C 11/04; B64C 11/30; B64C 11/20; F01D 5/30
See application file for complete search history.

(56) References Cited

U.S. PATENT DOCUMENTS 5,022,825 A  6/1991 Violette et al.
5,082,424 A * 1/1992 Husain .................... B64C 11/02
                                                                  403/291

* cited by examiner

*Primary Examiner* — Christopher Verdier
*Assistant Examiner* — Christopher R Legendre
(74) *Attorney, Agent, or Firm* — Hanley, Flight & Zimmerman, LLC

(57) ABSTRACT

Methods and apparatus to retain a rotor blade are disclosed herein. An example apparatus includes a rotor blade coupled to a rotatable hub of an engine system. The rotor blade includes a root, a flange and a blade. The root and the flange are disposed inside a cowling, and the blade is disposed outside of the cowling. The example apparatus also includes a retainer disposed inside the cowling adjacent the flange. The flange is to engage the retainer to retain the rotor blade with the engine system.

20 Claims, 7 Drawing Sheets

US 9,751,616 B1

METHODS AND APPARATUS TO RETAIN A ROTOR BLADE

FIELD

The present disclosure relates generally to rotor blades and, more particularly, to methods and apparatus to retain a rotor blade.

BACKGROUND

Generally, an open fan engine system for an aircraft includes counter-rotating fans in which fan blades are disposed outside of an engine housing. The fan blades may be coupled to a pitch mechanism to control a pitch angle of the fan blades.

SUMMARY

An example apparatus includes a rotor blade coupled to a rotatable hub of an engine system. The rotor blade includes a root, a flange and a blade. The root and the flange are disposed inside a cowling, and the blade is disposed outside of the cowling. The example apparatus also includes a retainer disposed inside the cowling adjacent the flange. The flange is to engage the retainer to retain the rotor blade with the engine system.

Another example apparatus disclosed herein includes a retainer to be coupled to an open fan engine system to rotate with a rotor blade. The retainer defines an aperture through which the rotor blade is to extend, and the retainer is to engage the rotor blade if a portion of the rotor blade moves toward the retainer.

Another example apparatus disclosed herein includes a rotor blade to be coupled to an open fan engine system. The rotor blade includes a root, a flange and a blade. A portion of the flange extends away from a longitudinal axis of the rotor blade. The flange is to engage a portion of the open fan engine system if a portion of the rotor blade including the flange moves toward the portion of the open fan engine system.

An example method disclosed herein includes coupling a root of a rotor blade to a rotatable hub of an engine system. The rotor blade includes a flange disposed along the root. The example method further includes disposing the rotor blade adjacent a retainer such that if a portion of the rotor blade including the flange moves away from the hub, the flange engages the retainer to retain the rotor blade with the engine system.

The features, functions and advantages that have been discussed can be achieved independently in various examples or may be combined in yet other examples further details of which can be seen with reference to the following description and drawings.

Figure 1:
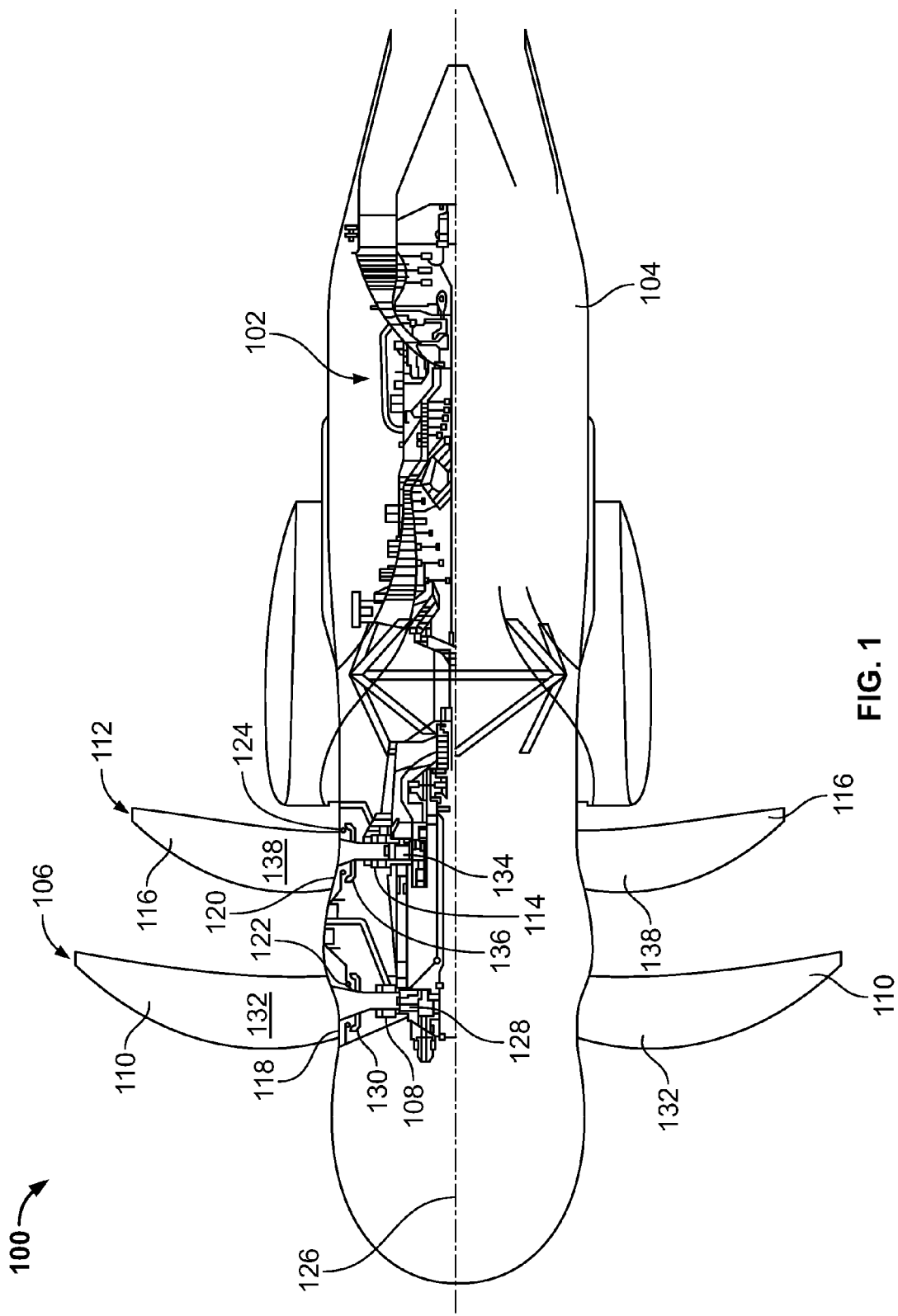
FIG. 1 illustrates an example open fan engine system disclosed herein.

Wherever possible, the same reference numbers will be used throughout the drawing(s) and accompanying written description to refer to the same or like parts. As used in this disclosure, stating that any part (e.g., a layer, film, area, or plate) is in any way positioned on (e.g., positioned on, located on, disposed on, or formed on, etc.) another part, means that the referenced part is either in contact with the other part, or that the referenced part is above the other part with one or more intermediate part(s) located therebetween. Stating that any part is in contact with another part means that there is no intermediate part between the two parts.

DESCRIPTION

Methods and apparatus to retain a rotor blade are disclosed herein. An example open fan engine system may include an open fan including a plurality of rotor blades. In some examples, blades of the rotor blades are disposed outside of a cowling. Roots of the rotor blades may be disposed inside the cowling and coupled to a rotatable hub, which is driven by an engine. In some examples, the roots are coupled to a pitch mechanism to enable pitch rotation of the rotor blades. The example rotor blades disclosed herein include flanges to engage a retainer disposed inside the cowling to retain the rotor blade with the open fan engine system. Thus, the example methods and apparatus disclosed herein enhance retention of rotor blades with open fan engine systems.

FIG. 1 is a cutaway view of an example open fan engine system 100 (e.g., an unducted fan engine system, open rotor engine system, etc.) disclosed herein. The example open fan engine system 100 of FIG. 1 includes a multi-stage turbine engine 102 disposed in a cowling assembly 104. Other examples employ other engines. The example open fan engine system 100 includes an upstream open fan 106 having a rotatable upstream hub 108 and a plurality of upstream rotor blades 110. The example open fan engine system 100 also includes a downstream open fan 112 having a rotatable downstream hub 114 and a plurality of downstream rotor blades 116. Other examples include other numbers of open fans (e.g., a single open fan). In the illustrated example, the engine 102 is coupled to the upstream open fan 106 and the downstream open fan 112 via the upstream hub 108 and the downstream hub 114, respectively.

The cowling assembly 104 includes an upstream rotatable cowling 118 and a downstream rotatable cowling 120. The example upstream rotatable cowling 118 is coupled to the upstream hub 108 to rotate with the upstream open fan 106. The example downstream rotatable cowling 120 is coupled to the downstream hub 114 to rotate with the downstream open fan 112. In the illustrated example, the upstream rotatable cowling 118 includes a first retainer 122, and the downstream rotatable cowling 120 includes a second retainer 124. As described in greater detail below, the first retainer 122 retains the upstream rotor blades 110 with the example open fan engine system 100, and the second retainer 124 retains the downstream rotor blades 116 with the example open fan engine system 100.

During operation of the example open fan engine system 100 of FIG. 1, the engine 102 drives the upstream hub 108 and the downstream hub 114 to rotate the upstream open fan 106 and the downstream open fan 112 in opposite directions.

Thus, the example open fan engine system 100 of FIG. 1 is a counter-rotating open fan engine system. In the illustrated example, the upstream open fan 106 and the downstream open fan 112 rotate about a center axis 126 of the engine 102.

In the illustrated example, each of the upstream rotor blades 110 is coupled to the upstream hub 108 and a first pitch mechanism 128. During operation, the first pitch mechanism 128 rotates the upstream rotor blades 110 to adjust a pitch of the upstream rotor blades 110. Each of the example upstream rotor blades 110 includes a first flange 130 disposed inside the upstream rotatable cowling 118. In the illustrated example, the upstream rotor blades 110 extend through the upstream rotatable cowling 118 such that blades 132 of the upstream rotor blades 110 are disposed outside of the cowling assembly 104. As described in greater detail below, if a portion of one of the upstream rotor blades 110 moves toward the first retainer 122, the first flange 130 of the one of the upstream rotor blades 110 engages the first retainer 122 to retain the one of the upstream rotor blades 110 with the engine system 100.

The downstream rotor blades 116 of the example downstream open fan 112 are coupled to the downstream hub 114 and a second pitch mechanism 134. During operation, the second pitch mechanism 134 rotates the downstream rotor blades 116 to adjust a pitch of the downstream rotor blades 116. Other examples do not include pitch mechanisms. Each of the example downstream rotor blades 116 includes a second flange 136 disposed inside the downstream rotatable cowling 120. In the illustrated example, the downstream rotor blades 116 extend through the downstream rotatable cowling 120 such that blades 138 of the example downstream rotor blades 116 are also disposed outside of the cowling assembly 104. If a portion of one of the downstream rotor blades 116 including the second flange 136 moves toward the second retainer 124, the second flange 136 of the one of the downstream rotor blades 116 engages the second retainer 124 to retain the one of the downstream rotor blades 116 with the engine system 100. Thus, the second flanges 136 and/or the second retainer 124 enhance retention of the downstream rotor blades 116.

Figure 2:
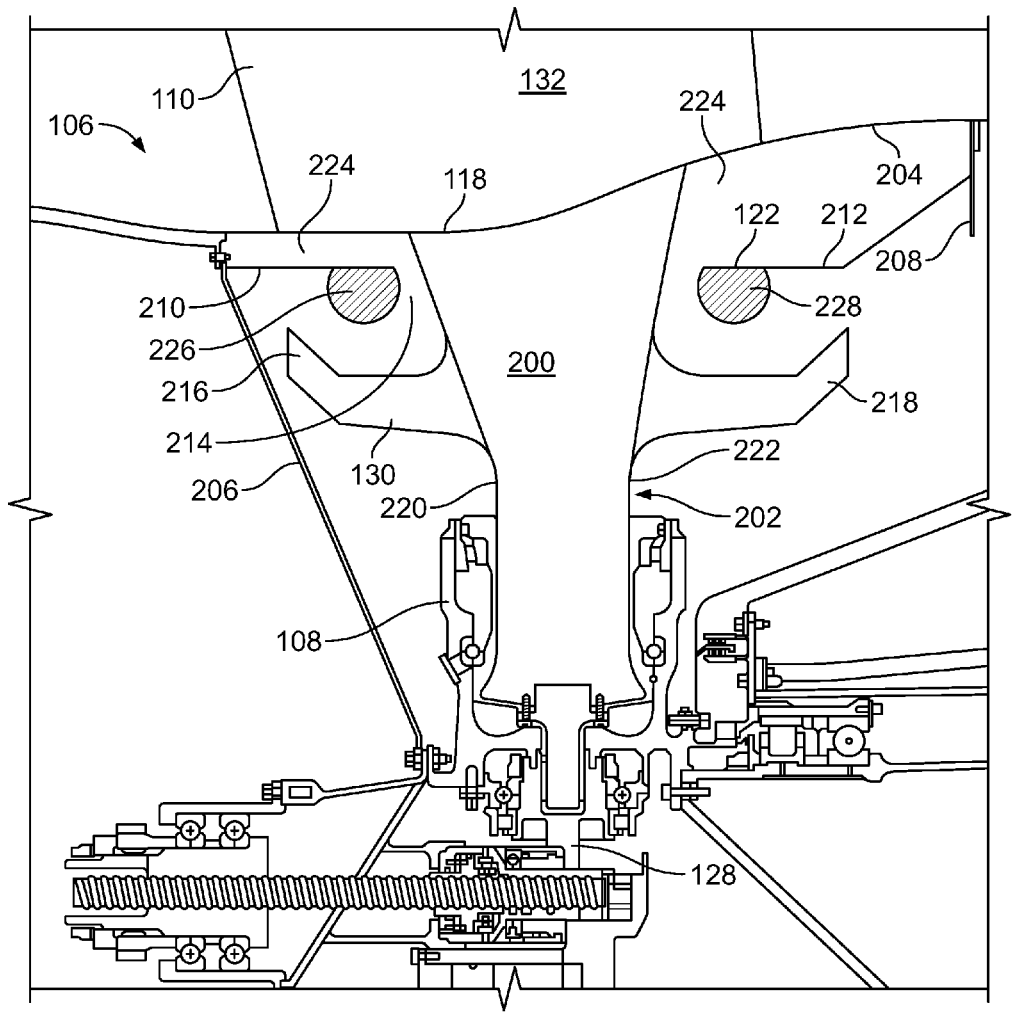
FIG. 2 is an enlarged view of an upstream open fan of the example open fan engine system of FIG. 1.

FIG. 2 is an enlarged, cutaway view of a portion of the upstream open fan 106 of FIG. 1. The upstream open fan 106 and the downstream open fan 112 are substantially similar. Therefore, the following description of the upstream open fan 106 can be applied to the downstream open fan 112. Thus, to avoid redundancy, the downstream open fan 112 is not separately described herein.

In the illustrated example, the upstream rotor blade 110 includes a root 200. The example upstream rotor blade 110 is coupled to the upstream hub 108 and the first pitch mechanism 128 via the root 200. In the illustrated example, the first flange 130 is disposed along the root 200 outward of the upstream hub 108 (i.e., above the upstream hub 108 in the orientation of FIG. 2). If a portion 202 of the upstream rotor blade 110 including the flange 130 moves toward the first retainer 122, the first flange 130 of the example upstream rotor blade 110 of FIG. 2 engages the first retainer 122 to retain the upstream rotor blade 110 with the example open fan engine system 100.

In the illustrated example, the first retainer 122 is coupled to the upstream rotatable cowling 118. The upstream rotatable cowling 118 illustrated in FIG. 2 includes an exterior wall 204, a first support 206 and a second support 208. In the illustrated example, the first retainer 122 is disposed inside the upstream rotatable cowling 118 between the first flange 130 and the exterior wall 204. The example first retainer 122 is coupled to the first support 206 and the second support 208 via a first bracket 210 and a second bracket 212, respectively. In some examples, some or all of the first retainer 122 is composed of titanium and/or Kevlar®. Other examples are composed of other material(s). In the illustrated example, the first retainer 122 defines an aperture 214 through which the upstream rotor blade 110 extends.

In some examples, a shape of the first flange 130 corresponds to a shape of the first retainer 122. In the illustrated example, the first flange 130 extends away from a longitudinal axis of the upstream rotor blade 110. In some examples, a longitudinal axis of the first flange 130 is substantially parallel to the center axis 126 of the engine 102. Other examples include flanges oriented differently than the first flange 130 illustrated in FIG. 2. The example first flange 130 of FIG. 2 includes a first hook 216 and a second hook 218. In the illustrated example, the first hook 216 is disposed on a first side 220 of the upstream rotor blade 110, and the second hook 218 is disposed along a second side 222 of the upstream rotor blade 110 opposite the first side 220. The example first hook 216 and the example second hook 216 curve or hook toward the exterior wall 204. In some examples, the first flange 130 is spaced apart from the blade 132 to define a space 224 to receive the first retainer 122.

The example first retainer 122 of FIG. 2 includes a first ring 226 and a second ring 228. The example first ring 226 is disposed on the first side 220 of the upstream rotor blade 110, and the example second ring 228 is disposed on the second side 222 of the upstream rotor blade 110. In the illustrated example, the first ring 226 and the second ring 228 have partially circular cross-sections. However, the above-noted shape is merely an example and, thus, other shapes (e.g., rectangular cross-sections) may be used without departing from the scope of this disclosure.

In the illustrated example, the first ring 226 is disposed in the space 224 and between the first hook 216 and the exterior wall 204 of the upstream rotatable cowling 118. The example second ring 228 of FIG. 2 is disposed in the space 224 and between the second hook 218 and the exterior wall 204 of the upstream rotatable cowling 118. In the illustrated example, the first hook 216 of the upstream rotor blade 110 surrounds a portion of the first ring 226, and the second hook 218 surrounds a portion of the second ring 228. Thus, if the portion 202 of the upstream rotor blade 110 moves away from the upstream hub 108, the first hook 216 engages the first ring 226 and the second hook 218 engages the second ring 228 to retain the upstream rotor blade 110 with the example open fan engine system 100. Thus, the example first flange 130 and/or the example first retainer 122 enhance retention of the example upstream rotor blade 110.

Figure 3:
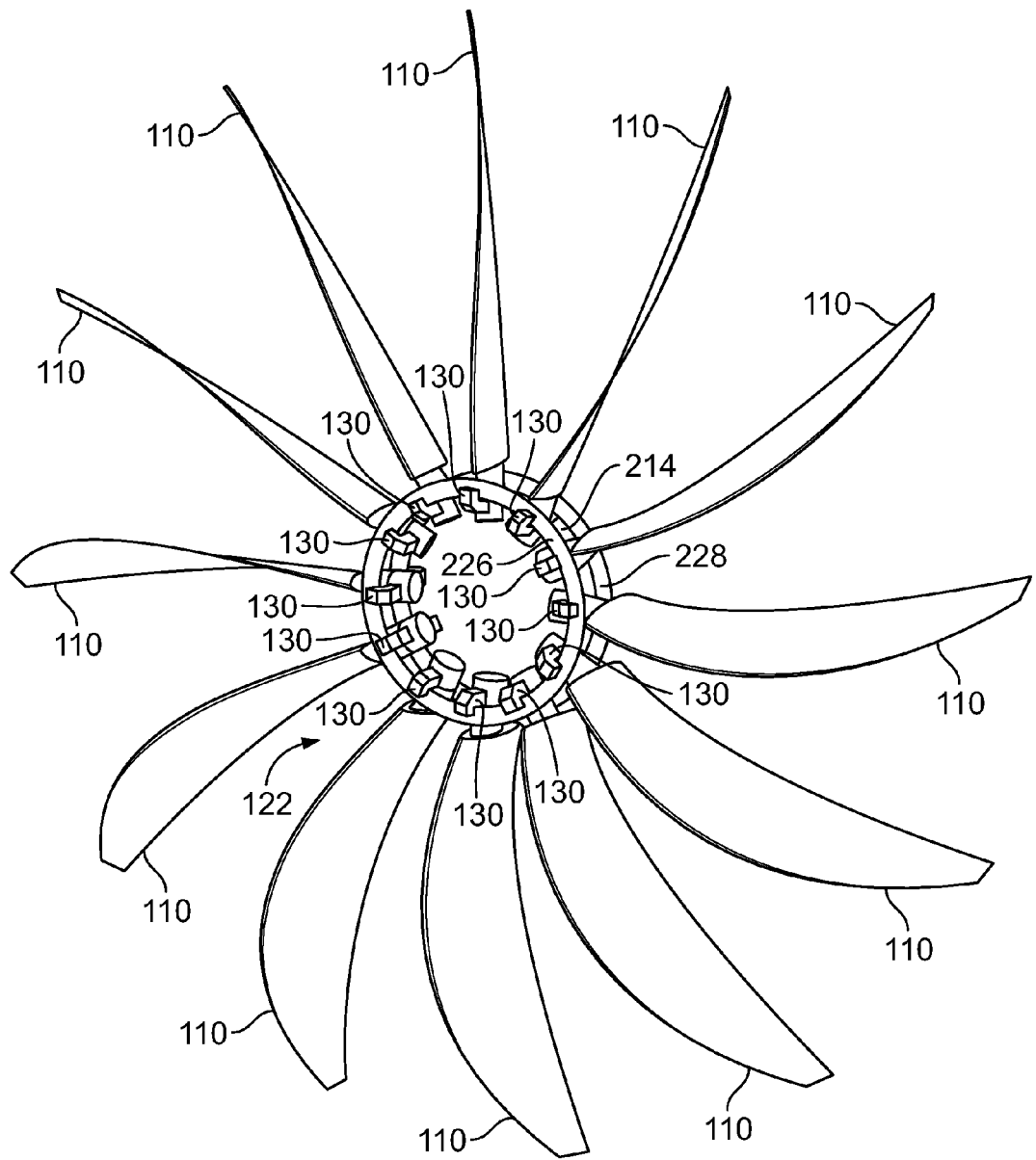
FIG. 3 illustrates an example retainer and example rotor blades of the example open fan engine system of FIGS. 1-2.

FIG. 3 illustrates the upstream rotor blades 110 and the example first retainer 122 of FIGS. 1-2. In the illustrated example, the first ring 226 and the second ring 228 are spaced apart to define the aperture 214 through which the upstream rotor blades 110 extend through the first retainer 122. The example first retainer 122 surrounds the upstream hub 108 and is disposed outward of each of the first flanges 130 of the upstream rotor blades 110 such that the first retainer 122 is positioned to engage each of the first flanges 130. The example first ring 226 and the example second ring 228 are substantially concentric and have substantially equal diameters. In the illustrated example, the first ring 226 and the second ring 228 are substantially coaxial with the center axis 126 of the engine 102 and, thus, rotate about the center axis 126 with the upstream open fan 106 and the upstream rotatable cowling 118 during operation of the example open fan engine system 100.

Figure 4:
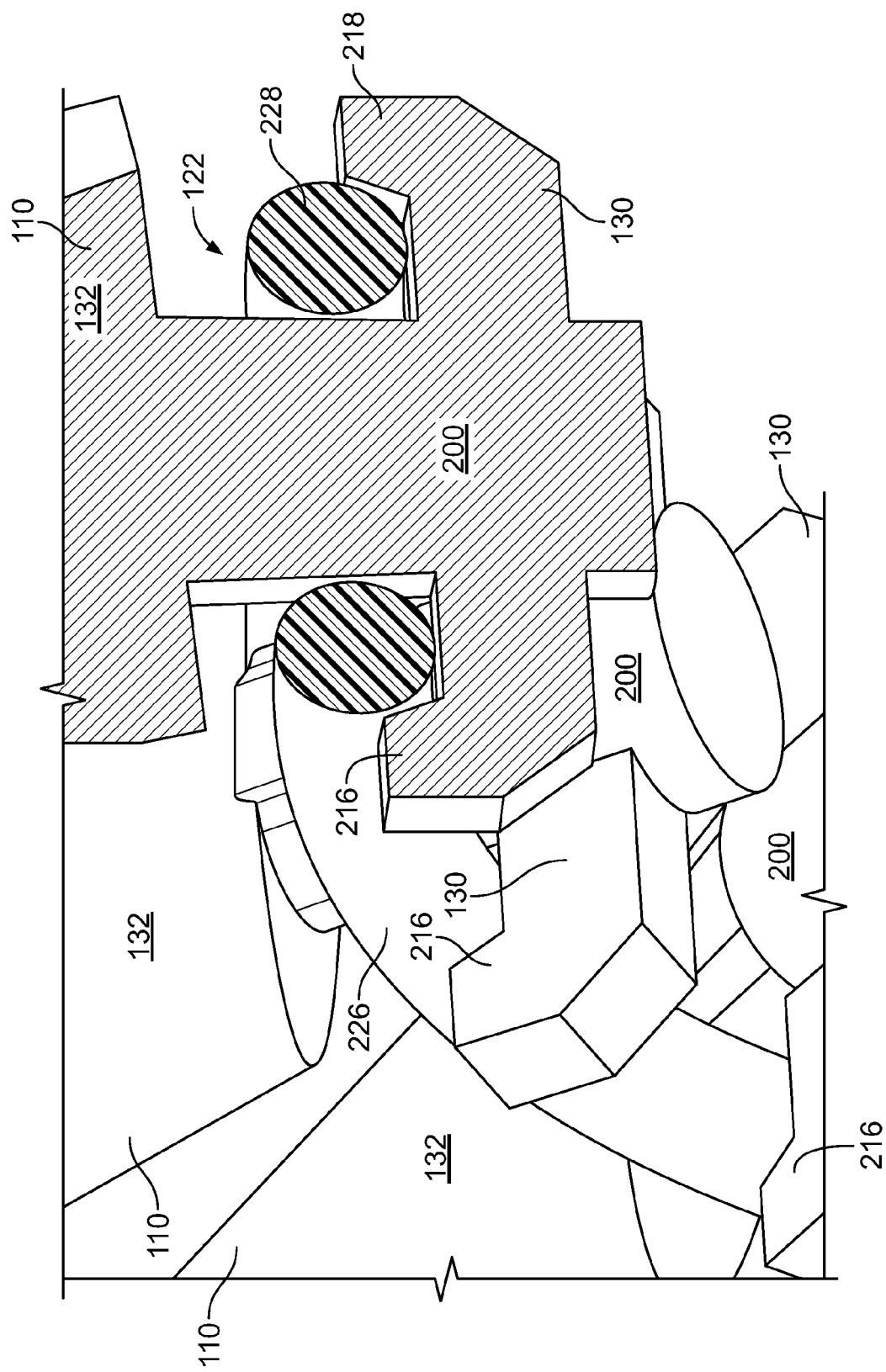
FIG. 4 is a cross-sectional view of the example retainer and one of the example rotor blades of FIG. 3.

FIG. 4 is an enlarged, cross-sectional view of the upstream rotor blades 110 and the example first retainer 122 of FIG. 3. In the illustrated example, the first hook 216 of each of the upstream rotor blades 110 surrounds a portion of the first ring 226. The second hook 218 of each of the upstream rotor blades 110 surrounds a portion of the second ring 228. As a result, if the pitch mechanism rotates the upstream rotor blades 110 a given amount, the first flanges 130 contact the first retainer 122. Thus, the example first retainer 122 enables a finite amount of pitch rotation. As described in greater detail below, other example retainers do not limit pitch rotation of rotor blades.

Figure 5:
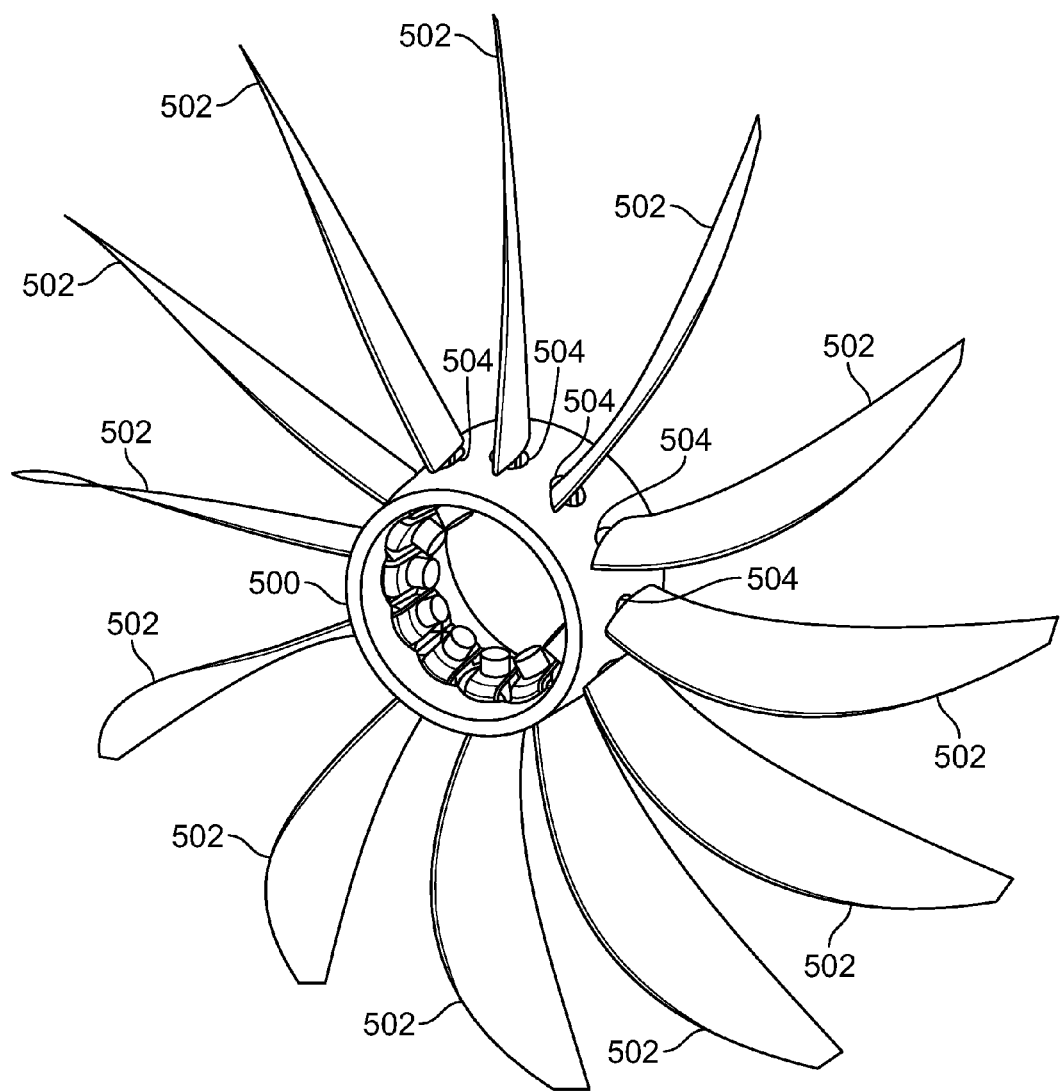
FIG. 5 illustrates another example retainer and other example rotor blades disclosed herein.

FIG. 5 illustrates another example retainer 500 and other example rotor blades 502 disclosed herein, which may be used in conjunction with an open fan engine system such as, for example, the open fan engine system 100 of FIG. 1. In the illustrated example, the retainer 500 is a ring defining a plurality of apertures 504. In some examples, some or all of the retainer 500 is composed of titanium and/or Kevlar®. Other examples are composed of other material(s). One of the rotor blades 502 extends through each of the apertures 504 of the example retainer 500. In some examples, the retainer 500 illustrated in FIG. 5 is disposed inside and coupled to a rotatable cowling such as, for example, the upstream rotatable cowling 118 of FIG. 1, the downstream rotatable cowling 120 of FIG. 1, or any other rotatable cowling. In other examples, the retainer 500 is integrally formed with the rotatable cowling.

Figure 6:
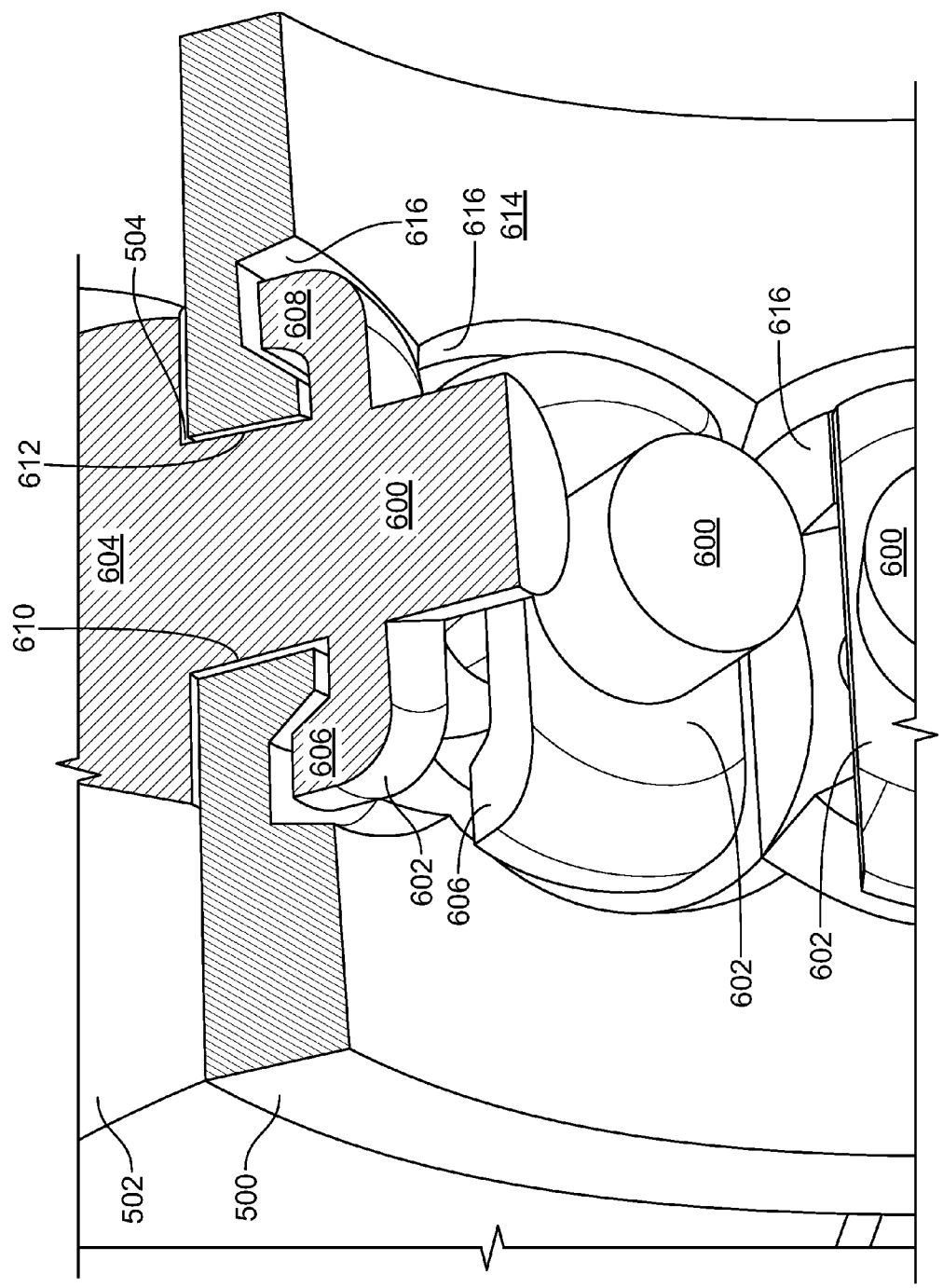
FIG. 6 is a cross-sectional view of the example retainer of one of the example rotor blades of FIG. 5.

FIG. 6 is an enlarged, cross-sectional view of the example retainer 500 and the example rotor blades 502 of FIG. 5. In the illustrated example, each of the rotor blades 502 includes a root 600, a flange 602 and a blade 604. In some examples, the root 600 is coupled to a hub such as, for example, the upstream hub 108 of FIG. 1, the downstream hub 114 of FIG. 1, or any other suitable hub. In the illustrated example, each of the flanges 602 includes a first hook 606 and a second hook 608 on a first side 610 of the rotor blade 502 and a second side 612 of the rotor blade 502, respectively. In the illustrated example, the first hook 606 and the second hook 608 curve or hook toward the retainer 500. In other examples, the flange 602 is disk-shaped and includes a rim (e.g., an annular rim) extending (e.g., curving) toward the blade 604. Other flanges are other shapes.

In the illustrated example, a cross-section of the retainer 500 is substantially rectangular. However, the above-noted shape is merely an example, and thus, other shapes may be used without departing from the scope of this disclosure. A surface 614 of the example retainer 500 adjacent the flanges 602 includes a plurality of annular grooves 616. Each of the grooves 616 surrounds one of the apertures 504 of the retainer 500 through which the rotor blades 502 extend through the retainer 500. In some examples, a size and a shape of each of the grooves 616 correspond to a size and a shape of each of the flanges 602. In the illustrated example, corresponding sizes and shapes of the grooves 616 and the flanges 602 enable portions of the first hook 606 and the second hook 608 to be disposed in the groove 616. In the illustrated example, the flanges 602 and the blades 604 of the rotor blades 502 are spaced apart from the retainer 500. Thus, the example rotor blades 502 of FIG. 6 are not in contact with the retainer 500. In other examples, the flanges 602 are in contact with the retainer 500 and/or coupled to the retainer 500 (e.g., rotatably coupled to the retainer 500 to enable pitch rotation of the rotor blades 502).

In some examples, the rotor blades 502 are coupled to a pitch mechanism such as, for example, the first pitch mechanism 128 of FIG. 1, the second pitch mechanism 134 of FIG. 2, or any other suitable pitch mechanism. In the illustrated example, the grooves 616 enables pitch rotation of the rotor blades 502 with an infinite rotational degree of freedom. If the root 600 of one of the example rotor blades 502 illustrated in FIG. 6 moves toward the example retainer 500, the first hook 606 and the second hook 608 engage the retainer 500 to retain the rotor blade 502 with the open fan engine system.

Figure 7:
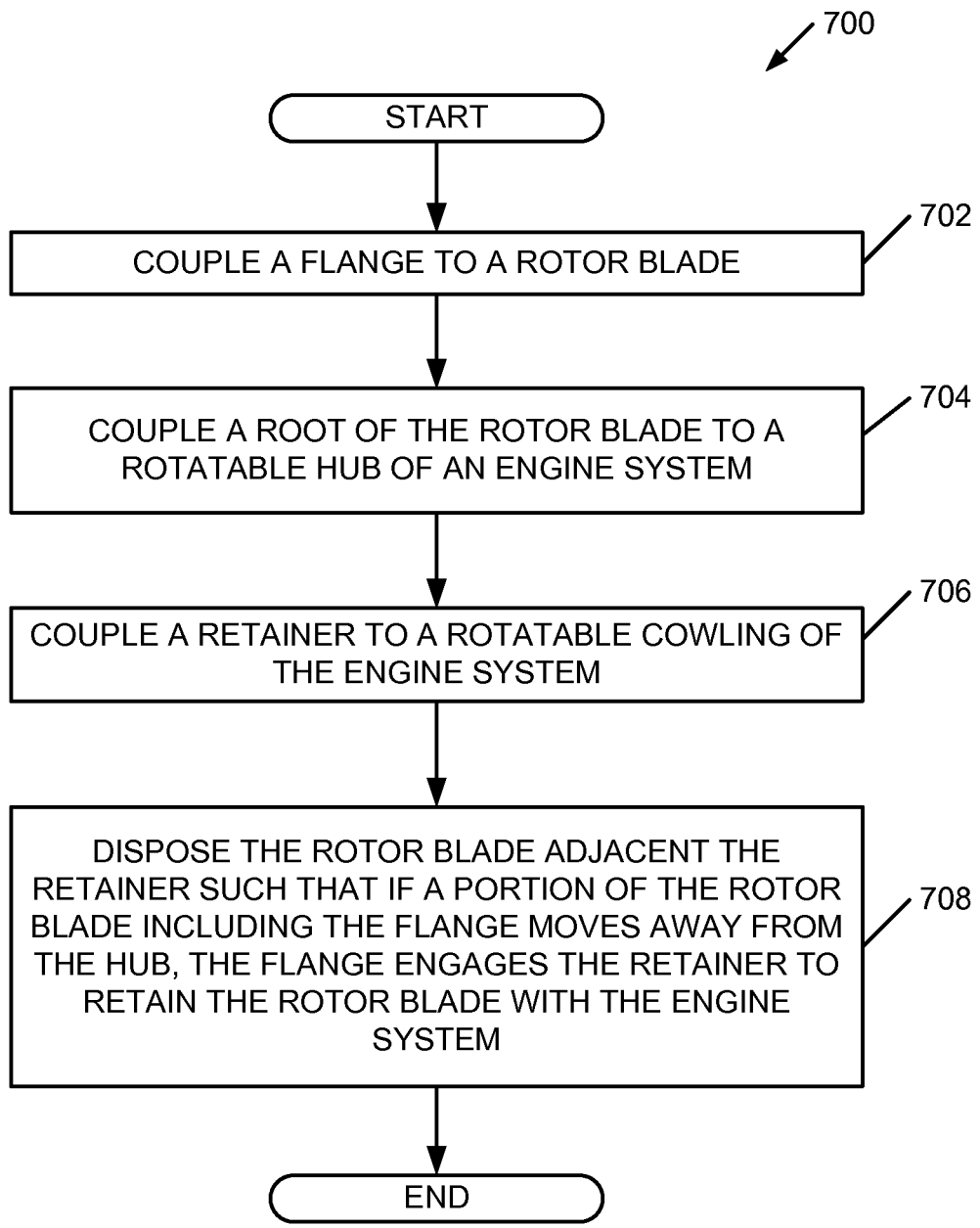
FIG. 7 is a flow chart representative of an example method disclosed herein.

FIG. 7 depicts an example flow diagram representative of methods or processes that may be implemented using, for example, computer readable instructions. The example process of FIG. 7 may be performed using a processor, a controller and/or any other suitable processing device. For example, the example process of FIG. 7 may be implemented using coded instructions (e.g., computer readable instructions) stored on a tangible computer readable medium such as a flash memory, a read-only memory (ROM), and/or a random-access memory (RAM). As used herein, the term tangible computer readable medium is expressly defined to include any type of computer readable storage and to exclude propagating signals. Additionally or alternatively, the example process of FIG. 7 may be implemented using coded instructions (e.g., computer readable instructions) stored on a non-transitory computer readable medium such as a flash memory, a read-only memory (ROM), a random-access memory (RAM), a cache, or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

Alternatively, some or all of the example process of FIG. 7 may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, one or more operations depicted in FIG. 7 may be implemented manually or as any combination(s) of any of the foregoing techniques, for example, any combination of firmware, software, discrete logic and/or hardware.

Further, although the example process of FIG. 7 is described with reference to the flow diagram of FIG. 7, other methods of implementing the process of FIG. 7 may be employed. For example, the order of execution of the blocks may be changed, and/or some of the blocks described may be changed, eliminated, sub-divided, or combined. Additionally, one or more of the operations depicted in FIG. 7 may be performed sequentially and/or in parallel by, for example, separate processing threads, processors, devices, discrete logic, circuits, etc.

FIG. 7 is a flowchart representative of an example method 700 that can be performed to enhance retention of a rotor blade with an engine system. With reference to FIGS. 1-6, the example method 700 of FIG. 7 begins by coupling the first flange 130 to one of the upstream rotor blades 110 (block 702). For example, the first flange 130 may be welded to the upstream rotor blade 110, coupled via one or more fasteners, integrally formed with the root 200, and/or coupled to the upstream rotor blade 110 using any other suitable technique. In some examples, the first flange 130 is coupled to the upstream rotor blade 110 along the root 200 of the upstream rotor blade 110. At block 704, the root 200 of the upstream rotor blade 110 is coupled to the rotatable upstream hub 108 of the open fan engine system 100. In some examples, the root 200 is coupled to the rotatable upstream hub 108 via a pitch mechanism such as, for example, the first pitch mechanism 128 of FIG. 1 to enable pitch rotation of the upstream rotor blade 100.

At block 706, the first retainer 122 is coupled to the upstream rotatable cowling 118 of the open fan engine system 100. In some examples, coupling the first retainer 122 to the upstream rotatable cowling 118 includes coupling the first ring 226 and the second ring 228 to the upstream rotatable cowling 118. In some examples, the example retainer 500 is coupled to the rotatable cowling 118. At block 708, the upstream rotor blade 110 is disposed adjacent the first retainer 122 such that if the portion 202 of the upstream rotor blade 110 including the first flange 130 moves away from the rotatable upstream hub 108, the first flange 130 engages the first retainer 122 to retain the upstream rotor blade 110 with the open fan engine system 100. In some examples, the upstream rotor blade 110 is disposed adjacent the first retainer 122 by enclosing the upstream rotatable hub 108 in the cowling assembly 104.

Although certain example methods, apparatus and articles of manufacture have been described herein, the scope of coverage of this disclosure is not limited thereto. On the contrary, this disclosure covers all methods, apparatus and articles of manufacture fairly falling within the scope of the claims.

The Abstract at the end of this disclosure is provided to comply with 37 C.F.R. §1.72(b) to allow the reader to quickly ascertain the nature of the technical disclosure. It is submitted with the understanding that it will not be used to interpret or limit the scope or meaning of the claims.

What is claimed is:

1. An apparatus, comprising:
a rotor blade including a root having a first end and a second end opposite the first end, a flange and a blade coupled to the second end of the root, the first end of the root coupled to a rotatable hub of an engine system via a pitch mechanism, the flange extending from the root between the first end and the second end, the root and the flange disposed inside a cowling, the blade disposed outside of the cowling, the flange including a first hook extending outward from a first side of the root and upward toward the cowling; and
a retainer disposed inside the cowling adjacent the flange, the flange to engage the retainer to retain the rotor blade with the engine system.

2. The apparatus of claim 1, wherein the retainer includes a groove to receive the first hook.

3. The apparatus of claim 1, wherein the retainer comprises a ring coaxial with an axis of rotation of the cowling.

4. The apparatus of claim 1, wherein the retainer defines an aperture through which a portion of the rotor blade is to extend.

5. The apparatus of claim 1, wherein the retainer comprises a first ring and a second ring, the first ring disposed on a first side of the rotor blade, the second ring disposed on a second side of the rotor blade.

6. The apparatus of claim 1, wherein the flange is spaced apart from the retainer.

7. The apparatus of claim 1, wherein the retainer is coupled to the cowling.

8. The apparatus of claim 1, wherein the flange is spaced apart from the blade to define a space to receive the retainer between the flange and the blade.

9. The apparatus of claim 1, wherein the flange includes a second hook extending outward from a second side of the root and upward toward the cowling, the second side of the root opposite the first side of the root.

10. The apparatus of claim 9, wherein the retainer includes a first ring and a second ring coaxial with the cowling, the first ring disposed adjacent the first side of the root and the second ring disposed adjacent the second side of the root, the first ring disposed between the first hook and the cowling and the second ring disposed between the second hook and the cowling.

11. The apparatus of claim 10, wherein the first hook extends from the first side of the root further than the first ring and the second hook extends from the second side of the root further than the second ring.

12. An apparatus, comprising:
a rotor blade to be coupled to an open fan engine system, the rotor blade including a root having a first end and a second end opposite the first end, a flange and a blade coupled to the second end of the root, the first end of the root to be coupled to a pitch mechanism of the open fan engine system, a portion of the flange coupled to the root between the first end and the second end and extending away from a longitudinal axis of the rotor blade, the flange including a first hook extending outward from a side of the root and upward toward a cowling, the flange to engage a portion of the open fan engine system if a portion of the rotor blade including the flange moves toward the portion of the open fan engine system.

13. The apparatus of claim 12, wherein the flange comprises a second hook disposed on an opposite side of the rotor blade as the first hook.

14. The apparatus of claim 12, wherein the flange is spaced apart from the blade to define a space between the flange and the blade to receive a retainer.

15. A method, comprising:
coupling a first end of a root of a rotor blade to a rotatable hub and a pitch mechanism of an engine system, the root having a second end opposite the first end, the rotor blade including a flange disposed along the root between the first end and the second end, the flange including a first hook extending outward from a first side of the root and upward toward a rotatable cowling of the engine system; and
disposing a retainer adjacent the flange such that if a portion of the rotor blade including the flange moves away from the rotatable hub, the flange engages the retainer to retain the rotor blade with the engine system.

16. The method of claim 15, wherein disposing the retainer adjacent the flange comprises disposing a first ring adjacent the flange.

17. The method of claim 16, wherein disposing the retainer adjacent the flange comprises disposing a second ring adjacent the flange.

18. The method of claim 15 further comprising coupling the flange to the rotor blade.

19. The method of claim 15 further comprising coupling the retainer to the rotatable cowling.

20. The method of claim 15 wherein coupling the root of the rotor blade to the rotatable hub comprises coupling the root to the pitch mechanism, the pitch mechanism to enable pitch rotation of the rotor blade.

* * * * *